United States Patent [19]

Ducateau et al.

[11] Patent Number: 5,295,265
[45] Date of Patent: Mar. 15, 1994

[54] DEVICE FOR ENHANCING THE PERFORMANCE OF A REAL TIME EXECUTIVE KERNEL ASSOCIATED WITH A MULTIPROCESSOR STRUCTURE THAT CAN INCLUDE A LARGE NUMBER OF PROCESSORS

[75] Inventors: Michel Ducateau, Nogent Le Roi; Jean-Marie Sers, Velizy, both of France

[73] Assignee: Sextant Avionique, Meudon La Foret, France

[21] Appl. No.: 894,378

[22] Filed: Jun. 4, 1992

[30] Foreign Application Priority Data

Jun. 4, 1991 [FR] France .................. 91 06900

[51] Int. Cl.$^5$ .................................... G06F 9/40
[52] U.S. Cl. ....................... 395/650; 364/DIG. 1; 364/230; 364/230.3; 364/281.3; 364/280; 364/281.7; 364/281.8; 364/281.4
[58] Field of Search ............... 395/700, 650, 550

[56] References Cited

U.S. PATENT DOCUMENTS

| | | | |
|---|---|---|---|
| 4,885,684 | 12/1989 | Austin et al. | 395/700 |
| 5,088,034 | 2/1992 | Ihara et al. | 395/700 |
| 5,121,498 | 6/1992 | Gilbert et al. | 395/700 |
| 5,230,050 | 7/1993 | Iitsuka et al. | 395/700 |

FOREIGN PATENT DOCUMENTS 0264317 9/1987 European Pat. Off. .

OTHER PUBLICATIONS

Microprocessing and Microprogramming, vol. 22, No. 1, Jan. 1988, Amerterdam, NL, pp. 11-21; M. P. Papazoglou et al.: A versatile kernel proposal for a multimicroprocessor ...; p. 13, colonne 2 ligne 10.

Software and Microsystems, vol. 1, No. 5, Aug. 1982, London; pp. 128-134; Shoja et al.; A control kernel to support ada intertask communication on a distributed muliprocessor comperuter system.

Operating Systems Review (SIGOPS), vol. 23, No. 3, Jul. 1989; New York, pp. 158-172; Holmes et al; A designer's perspective of the hawk multiprocessor operating system kernel.

Primary Examiner—Kevin A. Kriess
Attorney, Agent, or Firm—Browdy and Neimark

[57] ABSTRACT

A device for enhancing the performance of a real time executive kernel associated with a multiprocessor structure possibly comprising a large number of processors comprises a real time operator behaving, as seen from the processor of the structure, like a memory area. The real time operator sends and receives data to be processed, generates communication control signals and manages the real time context of the processors of the structure. It comprises a plurality of identical hardwired real time operator circuits accessible simultaneously by the processors of the structure but each associated with one only of said processors. The device can be used even if the structure comprises a large number of processors.

15 Claims, 11 Drawing Sheets

DEVICE FOR ENHANCING THE PERFORMANCE OF A REAL TIME EXECUTIVE KERNEL ASSOCIATED WITH A MULTIPROCESSOR STRUCTURE THAT CAN INCLUDE A LARGE NUMBER OF PROCESSORS

BACKGROUND OF THE INVENTION

1. Field of the Invention

The present invention concerns a device for optimizing the performance of real time primitives of a real time executive kernel in multiprocessor structures, especially, but not exclusively, multiprocessor structures on board an aircraft.

2. Description of the prior art

The execution of a job by a computer uses processors operating in highly disparate time scales. As a result a single complex job cannot use efficiently all the elements of a configuration. It is possible to increase efficiency if the job is broken down into a plurality of simpler jobs ready to be executed.

The fundamental role of the kernel is therefore to create a plurality of virtual machines that are almost independent of each other. This involves organizing how the different elements of the configuration (or resources) are shared between the jobs in progress. The kernel handles input-output management, firstly because the respective units are part of the resources that it monitors and secondly because events associated with input-output usually modify the status of jobs being executed. Finally, the kernel handles auxiliary functions such as date and time management.

To go into more detail, the kernel generates one or more virtual machines which usually have the following properties:

the virtual machine is a multiprocessor capable of executing a plurality of programs apparently simultaneously: to this end the operating system distributes processor time and main memory between entities called "tasks" and may also provide intertask communication mechanisms;

the kernel handles the details of input-output operations: scheduling, error correction and synthesis of complex operations. The programming language of the kernel virtual machine is in the form of an extension of the machine language of the host computer, a special mechanism enabling new instructions called primitives to be created, the role of these primitives being to request intervention of the kernel to execute complex operations. It is at this level that are found the so-called "real time" functions enabling use of devices reserved to the system.

The kernel virtual machine is accessible from higher level machines and, through the latter, from tasks submitted by users.

Above the kernel are subsystems which create tasks and submit them to the kernel for execution.

From the point of view of the kernel a task represents a job to be executed, that is to say the combination of a program and data to which it applies. The context of a task is the set of all information accessible to it, that it modifies or which may condition its execution. The program of a task cannot distinguish between two identical contexts. A task can therefore be interrupted at any point and restarted later without affecting the processing that it performs, provided that its context is restored to the state in which it was interrupted.

From the point of view of the kernel a task can be in either of the following two fundamental states:
active if it is executing on one of the processors of the configuration;
waiting otherwise; it may be awaiting an event if it has subcontracted an operation to another element of the configuration and is waiting for this to finish; it may equally well be awaiting a resource if it requires a unit that is not available to continue working.

A resource is a component of a data processing system that can be individually allocated to a task; a resource is said to be preemptible if it is released under the control of the system or non-preemptible if it is released under the control of the user task.

In multiprocessor architectures, and especially in multimicroprocessor architectures, implementing the kernel virtual machine by programming a machine language of the system has a number of drawbacks associated in particular with the power (lack of power) of the microprocessors which yields mediocer performance (excessively long execution times, for example) incompatible with some applications and in particular with real time applications of the kind used by systems on board aircraft, for example, in particular as aids to aircraft control and navigation.

It should be borne in mind that the recent rapid developments in aircraft performance are due in no small part to the proliferation of digital electronics.

Digital electronics implies a severe real time context and attempts to implement the real time kernal at the software level are not a good match to the requirements of an avionics type real time environment.

This is the case, for example, with the device described in the patent DE-A-3 105 527 which implements a real time executive kernel using a dedicated machine adapted to perform algorithms executed in the primitives of said kernel.

With a view to eliminating these drawbacks there have already been proposals, for example in the French patent publication No 2,604,543, to implement a real time executive kernel using a microprogrammed and hard wired logic machine dedicated to the algorithms executed in the primitives of the kernel. This machine is similar to a coprocessor associated with the system and in which the objects managed, which may comprise tasks, hardware and software events, resources and time, are associated with a series of basic primitives which can be combined to obtain the primitives of the kernel implemented on the system for a given application, these primitives constituting the kernel that the processors use to enable the machine to manage the tasks for carrying out the functions.

This system has the advantages that it responds specifically to the requirements of onboard data processing in an appropriate real time environment and that it provides:
shorter execution times for real time primitives in multiprocessor architectures,
machine (processor type) independence,
a hardware implementation suitable for use on board aircraft (compact overall dimensions, low power consumption),
processing of external events in minimum time,
easy implementation of various kernels,
easy interfacing to high-level language compilers.

However, this solution is limited in terms of performance because it employs a single machine to be used by all the processors of the multiprocessor structure.

A particular object of the invention is to circumvent this problem in such a way as to enhance the performance of the system.

SUMMARY OF THE INVENTION

The present invention consists in a device for optimizing the performance of a real time executive kernel in a multiprocessor structure comprising one or more processors, said device comprising a real time operator behaving, as seen from a processor of the structure, as a memory area and comprising means for implementing a real time operator function comprising the sending and the receiving of data to be processed, for generating communication control signals, for managing the real time context of the processors of the structure, for associating with the objects managed by a kernel, especially tasks, hardware and software events, resources and time, a series of primitives one primitive at a time to handle the management of the clock resource and of the active resources, for managing the real time context of the processors of the structure on the basis of a predetermined strategy by means of a scheduler, said scheduler being adapted in particular to activate the tasks cyclically, for marking waits on timers, for activating tasks after timers, and for deciding to change the state of a task to another state on the basis of the primitives of the real time context, wherein said real time operator comprises a plurality of identical hardwired real time operator circuits accessible simultaneously by the processors of the structure but each associated with one only of said processors, said circuits being interconnected by a link adapted to transmit an "AGREED" signal whereby it is possible to ensure that the real time operator executes only one primitive at a time, each real time operator circuit comprising a scheduler adapted to manage the tasks of only the processor associated with it and global resources and events of the real time operator function, said scheduler being adapted in particular to activate the tasks cyclically, to mark waits on timers and to activate tasks after timers, the real time operator deciding to change the task state on the basis of primitives of the real time context.

In a device of this kind, each real time operator circuit is in at least one of the following three states:
a) a first state in which it processes a primitive requested by one of the processors of the structure,
b) a second state in which it processes a local request internal to the circuit concerning only tasks for which it is responsible (expiry of a timer or occurrence of a hardware event),
c) a third state in which it is awaiting processing.

The RTO (real time operator) is designed to accept a primitive for processing only if all the RTO circuits are awaiting processing. To assure processors exclusive access to the RTO, each of the RTO circuits comprises a "test and set" type mechanism whereby after a request to access a processor in read mode at a specific RTO address the RTO checks that all the RTO circuits are awaiting processing (using the link sending the dedicated AGREED signal).

If all the RTO circuits are awaiting processing, the processor receives the response "RTO free" and can send the code and the parameters of the primitive, the RTO being reserved to this processor until processing of the primitive is finished.

By this means, no other processor can obtain the agreement of the RTO for the processing of a primitive unless the processor which sent the primitive currently being processed and all the processors at which this primitive has caused a task change have read their respective report.

If at least one of the RTO circuits is currently processing the processor receives the response "RTO busy" and must repeat the request until it receives the response "RTO free".

Because an RTO circuit can accept processing (primitive or local processing) immediately it has finished the current processing, the RTO can process in parallel a primitive and a plurality of local processes. This represents a significant enhancement of system performance.

To be more precise, in the device previously described, communication between the multiprocessor structure and the real time operator is by way of the following process:

request for access to the real time operator by the structure to process a primitive, this mode comprising verification beforehand by the structure of free access to the real time operator and subsequent hardware response to said verification from the real time operator to the structure, if the real time operator is free, sending of the code and of the parameters of the primitive to the real time operator merely by writing the real time operator addressing area, execution by the real time operator after acquisition of said codes and of said parameters of an operational sequence relating to the primitive, the decision by the real time operator, on the basis of said primitive and of the real time context:
 to produce the response to the processor which requested the primitive,
 to interrupt the processors on which the primitive has caused a task change, and reading of the real time operator response by the processor which requested the primitive and by the processors which have received an interrupt, at the real time operator address.

The RTO components schedule tasks (choice algorithm) and each allocates its associated processor to one of its eligible tasks according to the chosen strategy.

A priority-based strategy, for example, allocates the associated processor to the highest priority task that can execute on that processor.

Of course, any RTO component can interrupt its associated processor if a task having a higher priority than the current task is elected.

This is done by sending an interrupt to the processor concerned, the RTO component then waiting until the processor is in a position to read the parameters which tell it the new task to be executed.

As previously mentioned, the objects manipulated by the RTO are tasks, hardware and software events, resources and time. In the context of the invention these objects are defined as follows:

Tasks:

A task is a program to be executed on a processor to implement a general function of the application.

To begin or continue its execution, a task may encounter timing, hardware or software conditions. A fundamental condition is that the associated processor is available, given task execution priorities.

A task can assume different states during an application cycle. These states are defined by a state transition graph and the transitions are conditioned by the execution of primitives encountered, external events (external interrupts) and time events.

A task has attributes which characterize it and which also condition it execution:
priority number,
time protection,
etc.

Events:

An event is a mechanism which synchronizes either a plurality of tasks with each other or one or more tasks with the external environment.

When an event occurs the tasks awaiting that event can continue executing under certain conditions (processor available, no other waiting, etc).

An RTO component manages two types of software event:
a local event known only to the associated processor (only tasks of the associated processor can manipulate or await this event),
a global event (any task of the multiprocessor structure can manipulate or await this event).

A number of events can also be activated by hardware: the detection of a transition on one of the external interrupt input pins initiates processing local to the component producing the same effects as activation by a primitive of the correspondingly numbered event.

Resources:

The RTO manipulates several types of resource:
active resources or processors,
clock resource,
passive resources (system element, subroutine or non-sharable hardware).

They are not managed identically:
the passive resource constitutes the mechanism for controlled sharing of possession of a hardware or software element,
the clock resource and the active resources are managed by the RTO but they cannot be manipulated directly by primitives.

Time:

The real time clock is the timing reference for process control and ensures correct sequencing of the application and compliance with timing constraints associated with the environment.

The RTO manages time in order to perform functions including cyclic activation of tasks, marking time-outs or activating tasks after a time-out, and the handles time checks for each task (execution time, in other words the time for which the task is in the "current" state; completion time, in other words the time elapsed between activation and termination of a task).

A task can be in any of the following five states:

Dead

A dead task is a task known to the application but which is not attached to its execution context. If a problem occurs the tasks can no longer execute. They are no longer managed.

Dormant

The task has all the parameters needed to start its application. This is the normal state of a task which has just been initialized or whose execution has finished.

Eligible

An eligible task is a task waiting for an active resource. It can execute as soon as the scheduler designates it to assume control of the associated processor (the scheduler is the part of the RTO which determines processor allocation priorities for a task according to considerations of priority).

Elected

A task which has obtained possession of the associated processor changes from the "eligible" state to the "elected" state.

It can be pre-empted in favor of another task according to chosen scheduling criteria. If during its execution a task encounters a condition concerning it and relating to a timer, a resource of an event which has not been met, it cedes the processor to another task.

Suspended

An elected task which encounters an unsatisfied condition (see above) goes to the "suspended" state. When the condition is complied with the task returns to the "eligible" state. A task can be suspended on:
a timer,
a resource,
an event,
a cycle.

According to other specific features of the invention:
a) The primitives associated with tasks which use the processor to communicate with the RTO are indicated hereinafter with the associated objects in parentheses:

Activate (task) which represents the change from the "dormant" state of the task to the "eligible" state.

Terminate (task) which represents the change from the "elected" state of the task to the "dormant" state.

Kill (task) which represents the change from any state of the task to the "dead" state (in this case the task is no longer managed by the RTO).

Consult (task, attribute) which provides information on the attributes of the task such as its priority, its status, etc.

b) The primitives associated with resources (not sharable by the processors) comprise at least:

Reserve (resource) which requests the taking possession of the resource by a task. In this case, the task is placed in the "suspended" state if the resource is busy. If the resource is free, however, the task continues to execute.

Free (resource) which marks the end of possession of a resource. After this freeing of the resource, the task can be pre-empted in favour of another, higher priority task waiting for the resource.

Test (resource) to determine the status of the resource.

c) The primitives associated with events comprise at least:

Report (event) which creates a pulse on the software event, for example the end of a calculation.

Wait (timer), wait (event) which suspend the task executing the primitive, the task going to the "eligible" state when the condition is met.

There are various types of primitive, namely:
local primitives which are requested by a processor Pi and concern only the processor Pi (example: processor Pi requests activation of a task Tj on processor Pi),
global primitives which are requested by a processor Pi and concern all the processors Pj of the multiprocessor structure (example: processor Pi requests that the status of the global event "EVK" is changed to "occurred", which may activate tasks on any processor of the structure),
remote primitives which are requested by a processor Pi and concern only another processor Pj (i not equal to j) of the multiprocessor structure (example: processor Pi requests activation of a task TK on processor Pj).

In one embodiment of the invention, each real time operator circuit comprises at least four automatic devices dedicated to the management of specific real time objects, in particular management of eligible tasks awaiting availability of their processor, management of communications with processors, management of timers, cycles and the real time clock, resource queues, all tasks awaiting an event and processing of external interrupts, said automatic devices communicating with each other via buses internal to the real time operator circuit interconnected by a dynamic router under the control of the sequencer included in one of said automatic devices.

These RTO circuits may be grouped together on a common board connected to the common bus connecting all the processors of the structure with a common interface to the bus. Likewise, each RTO circuit could be installed on the board of the processor whose tasks it manages, with an interface to the common bus: in this case, when the associated processor accesses its RTO circuit it uses the common bus.

Also, each real time operator circuit could be colocated with the processor whose tasks it manages with an interface to the local bus so that when a processor of the multiprocessor structure executes a primitive it sends its parameters to the associated real time operator circuit via the local bus and simultaneously to the other real time operator circuits via the common bus, common bus arbiter logic assuring taking possession of the local bus of all the real time operator circuits during a single access.

Embodiments of the invention are described hereinafter by way of non-limiting example with reference to the appended drawings.

DETAILED DESCRIPTION OF THE INVENTION

In the following description:
an RTO component or an RTO circuit is an electronic component for real time management of the tasks of a single processor called the "associated processor",
the RTO (real time operator) is the set of RTO components whose function is real time management of the microprocessor structure (each RTO component manages only the tasks of its "associated processor" but resources and some events are global, in other words known to all the processors),
a local process is a process carried out by an RTO component in consequence of an internal cause (occurrence of a hardware event or expiration of waiting or protection timers) and not in consequence of a primitive request, and therefore concerning only the tasks of the associated processor.

Figure 1:
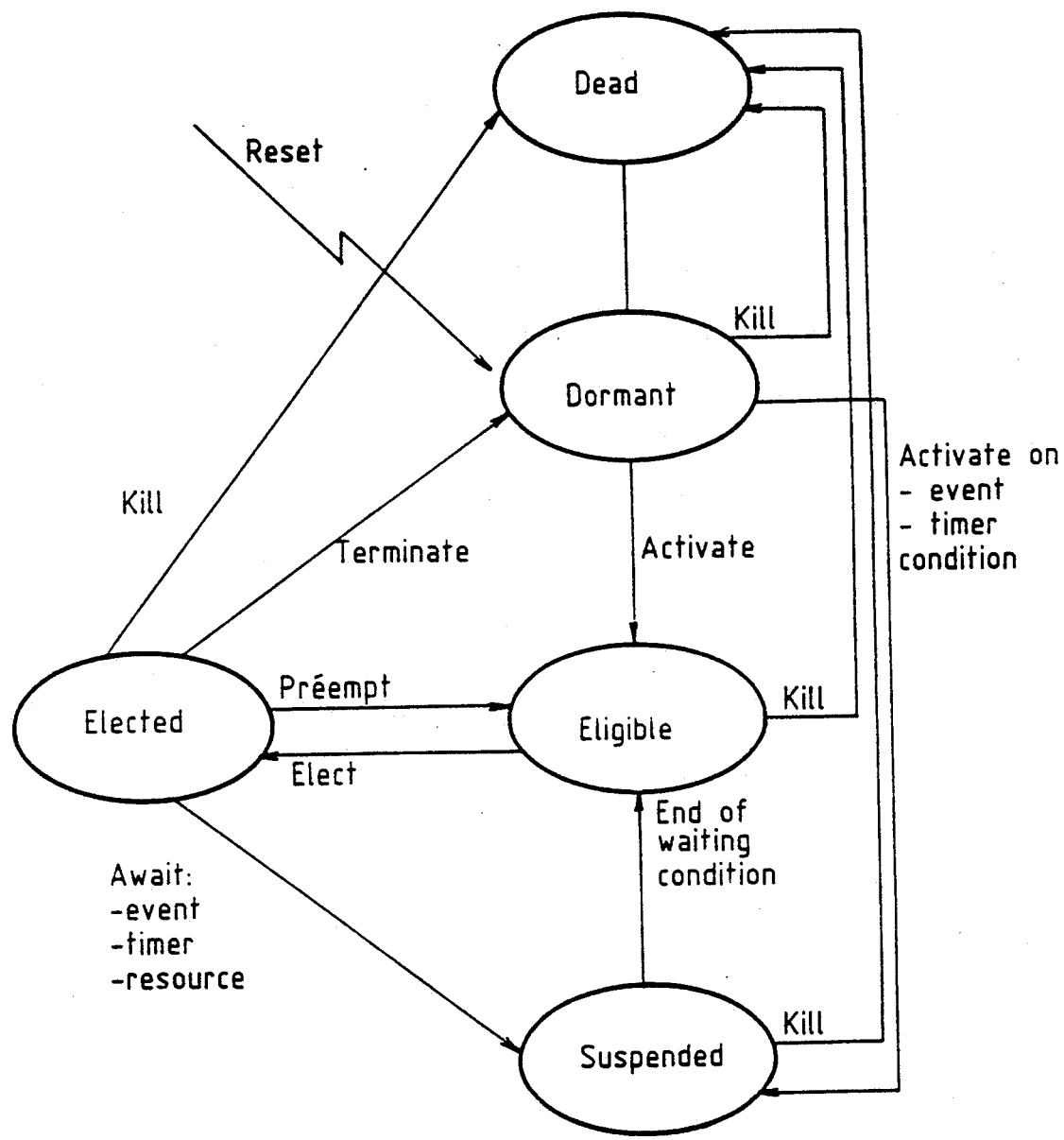
FIG. 1 is task status diagram showing the associated primitives.

The FIG. 1 diagram shows the various states that a task can assume and the possible transitions between these states which are conditioned by the execution of primitives encountered, external events (interrupts) and internal events.

As the diagram shows, it is possible to change from the "elected" state of a task to the "dead", "dormant", "eligible" and "suspended" states by execution of the respective primitives "kill", "terminate", "pre-empt" and "wait". Likewise, from the "suspended" state it is possible to change to the "dead" state or to the "eligible" state of a task by execution of the "kill" primitive and by the "end of waiting condition"; from the "dormant" state it is possible to change to the "dead" state and to the "eligible" state of a task by execution of the respective primitives "kill" and "activate"; and from the "eligible" state it is possible to change to the "dead" state and to the "elected" state by execution of the respective primitives "kill" and "elect".

Note that a scheduler can be called to allocate a processor to an eligible task only:
on a "suspended" to "eligible" transition,
on a "dormant" to "eligible" transition,
on an "elected" to "dormant" transition,
on an "elected" to "dead" transition, and
on an "elected" to "suspended" transition.

Figure 2A:
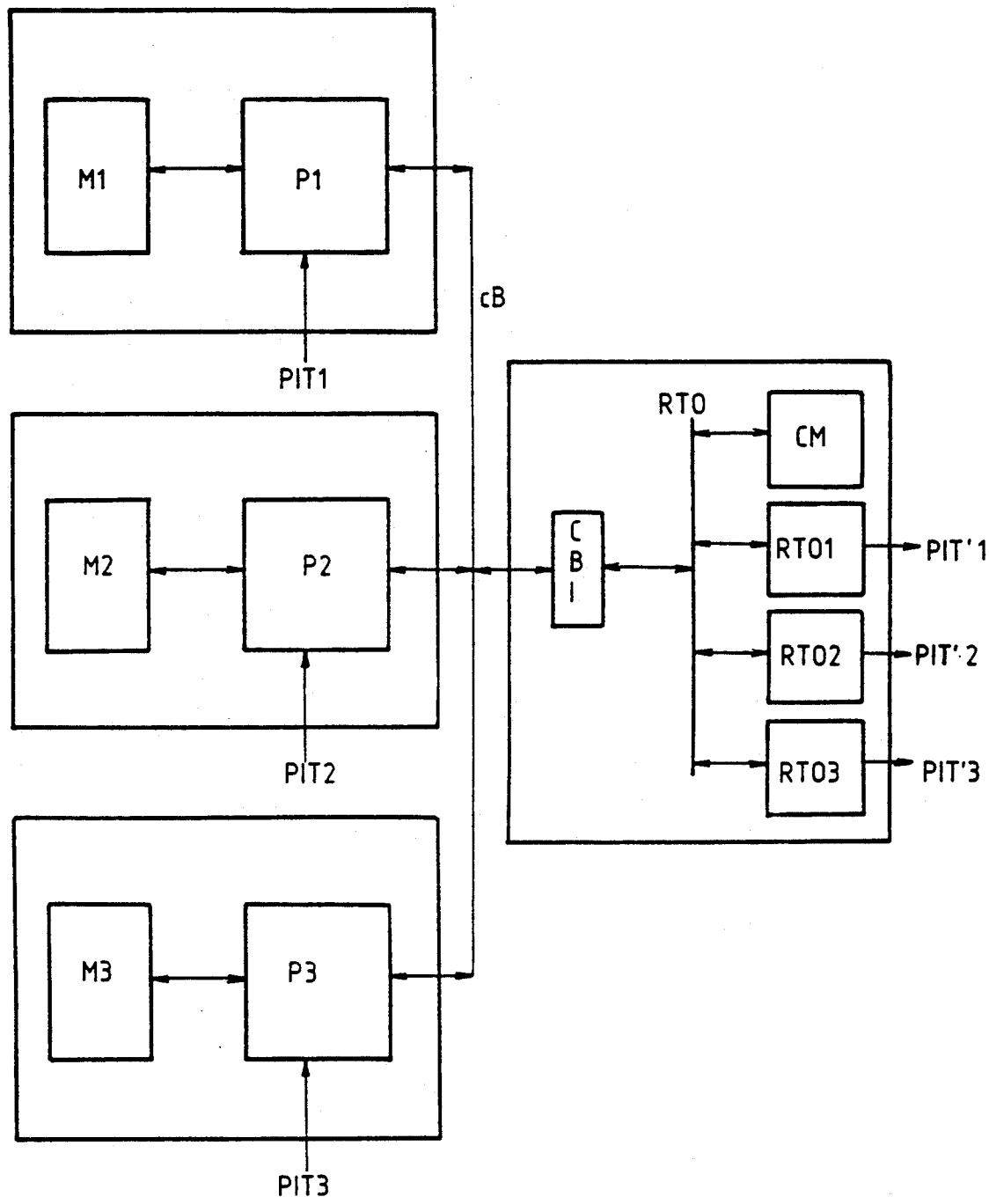
FIGS. 2a, 2b and 2c are block diagrams showing three possible modes of connection between a real time operator in accordance with the invention and a multiprocessor architecture.
Figure 2B:
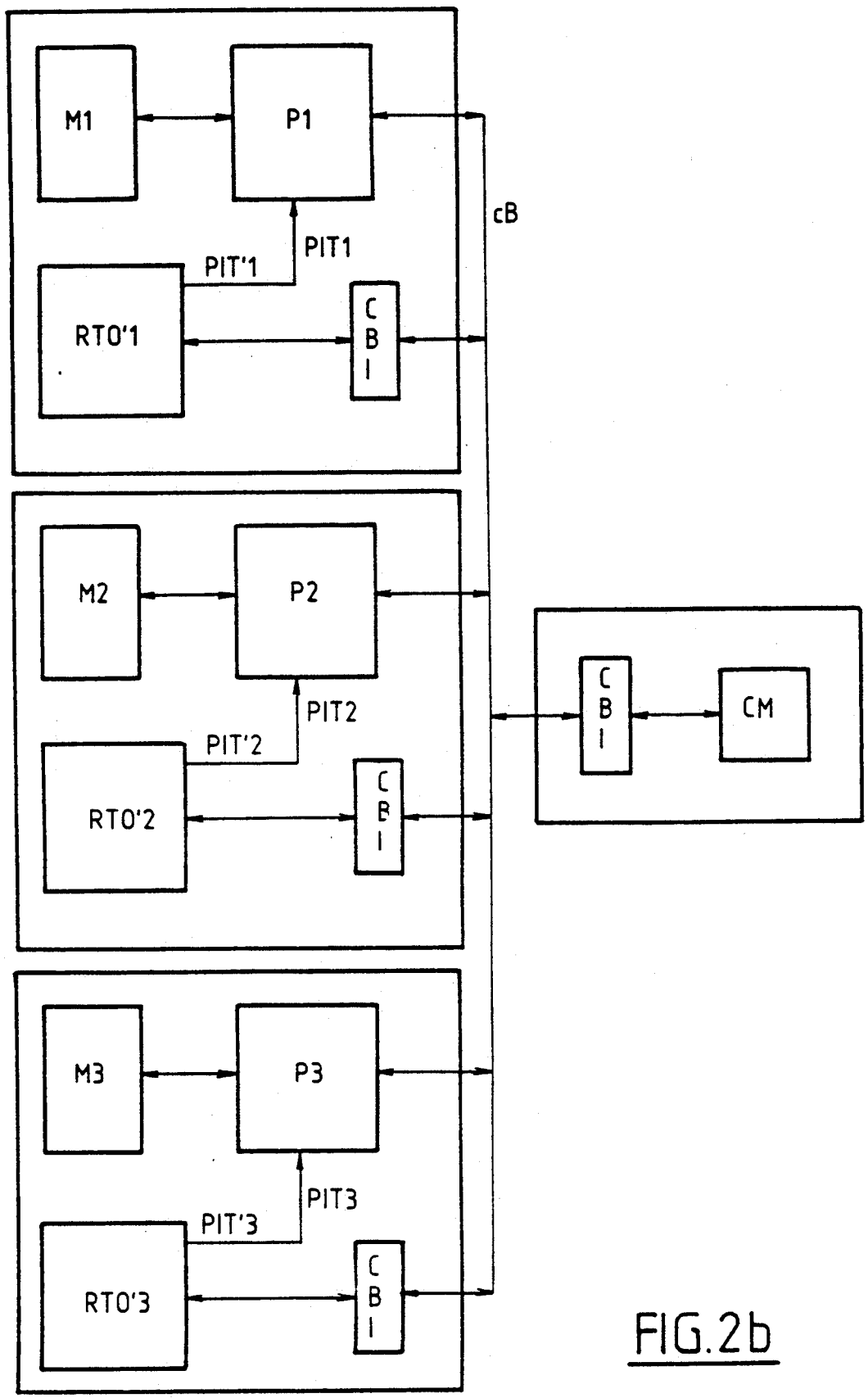
Figure 2C:
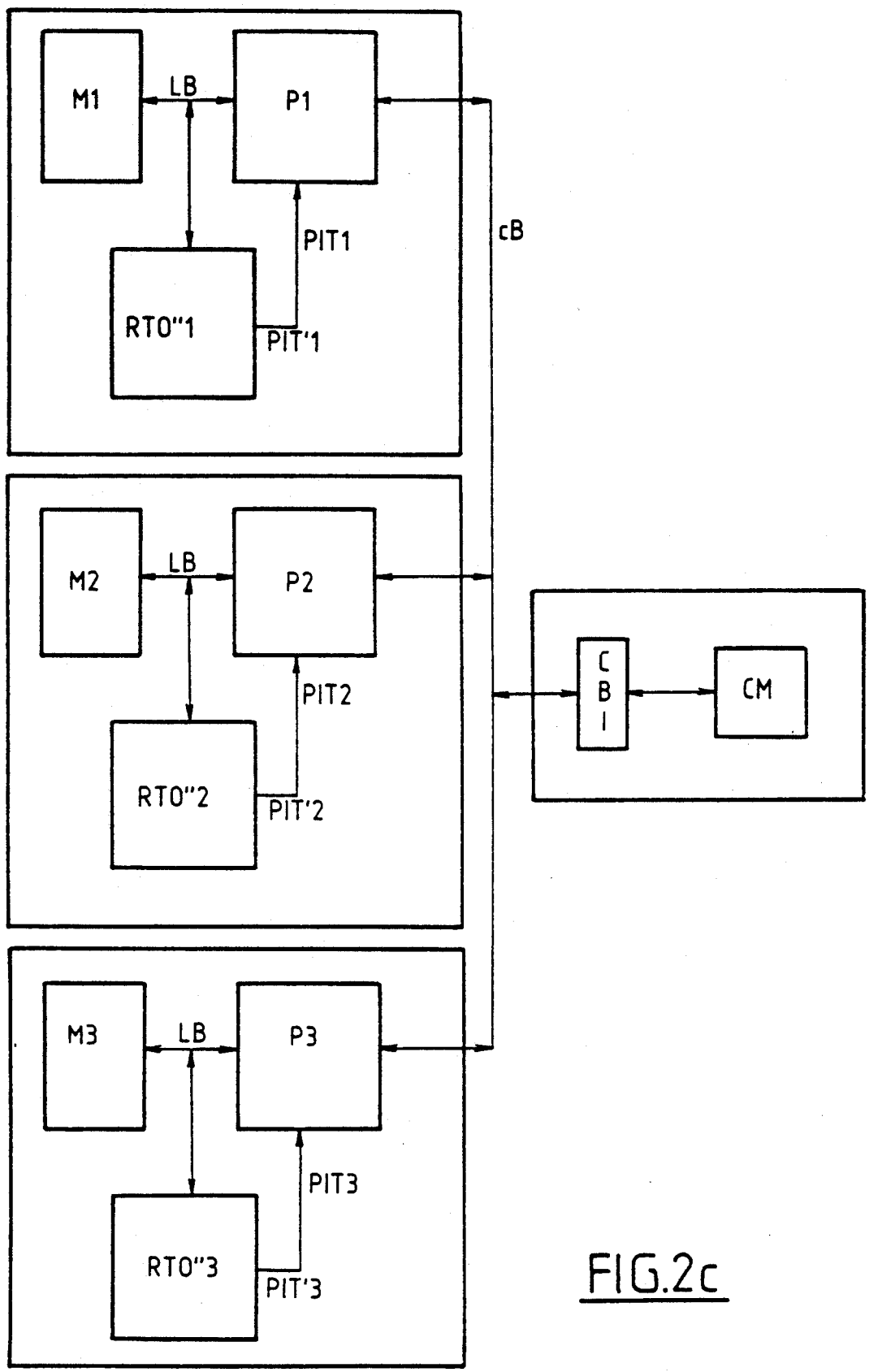

As shown in FIGS. 2a, 2b and 2c, the multiprocessor structure comprises three processors P1, P2 and P3 associated with respective local memories M1, M2 and M3 and each having an interrupt control input PIT1, PIT2 and PIT3.

The three processors P1, P2 and P3 are connected to a common bus CB to which a common memory CM may be connected.

In the FIG. 2a example, a real time operator (RTO) in accordance with the invention is also connected to the common bus CB through a dedicated interface CBI. Here the RTO comprises three RTO circuits RTO1, RTO2, RTO3 on the same circuit board which can also carry the common memory (this is a so-called "centralized" RTO). As seen from the processor, the operator behaves like a memory area common to the processors P1, P2 and P3. It has the circuitry needed to recognize addresses, to send and receive data to be processed and to generate communication control signals. In particular, it has three interrupt control outputs PIT'1, PIT'2 and PIT'3 respectively connected to the three inputs PIT1, PIT2, PIT'3.

In the FIG. 2b example an RTO in accordance with the invention is also connected to the common bus CB. The RTO comprises three RTO circuits RTO'1, RTO'2 and RTO'3 each on a processor board and connected to the bus CB by a dedicated interface CBI. As seen from the processor, this operator behaves like a memory area common to the processors P1, P2 and P3. It has the circuitry needed to recognize addresses, to send and receive data to be processed and to generate communication control signals. In particular, it has three interrupt control outputs PIT'1, PIT'2 and PIT'3 respectively connected to the three inputs PIT1, PIT2, PIT3.

In the multiprocessor architecture shown in FIG. 2c an RTO in accordance with the invention is also connected. Here the RTO comprises three RTO circuits RTO"1, RTO"2 and RTO"3 each on a processor board and connected to the local bus LB by a dedicated interface. The common bus CB interface assumes control of the local bus when a processor sends parameters to the RTO circuits via the common bus CB. The operator has the circuitry needed to recognize addresses, to send and receive data to be processed and to generate communication control signals. In particular, it has three interrupt control outputs PIT'1, PIT'2 and PIT'3 respectively connected to the three inputs PIT1, PIT2, PIT3.

Communications between one of the processors P1, P2 and P3 and the RTO are of three kinds:

Primitive request

Because the RTO processes only one primitive at a time any processor Pi requiring access to the RTO must first check if it is free. To this end the processor Pi reads a specific RTO address. The component RTOi recognizes this access and then uses the AGREED signal to ask the other components RTOj if they are free to process a primitive. The component RTOi if they are free to process a primitive. The component RTOi can then send its response (RTO free or busy) to Pi. This series of operations is executed at each component by logic independent of its sequencer so as not to disrupt the processing of any primitive being processed at the time.

Code and parameter sending

This is a simple write operation to the addressing area of the RTO after checking that the latter is free. Each component RTOi then waiting for a parameter; when the processor Pj writes a parameter at an RTO address, all the components RTOi acquire the parameter simultaneously.

RTO report read

There are two situations in which a processor Pi must read a report produced by the RTO:

a) When a processor Pi has sent a primitive it needs information contained in the RTO (actions to be undertaken: change of task; halt; number of task to suspend or to elect; primitive execution report). This information is accessed by reading at the RTO address. The component RTOj which processed the primitive sends the response because it alone has this information (in the case of a global primitive executed in parallel by all the RTO components it is the component RTOi associated with the processor Pi which sends the response).

b) The RTO can interrupt a processor Pi if, following processing local to the component RTOi or of a remote or global primitive requested by the processor Pj, a task of higher priority than the current task is "elected" on the processor Pi. This is achieved by the component RTOi sending an interrupt PITi to the associated processor Pi, the component RTOi then waiting until the processor Pi is in a position to read the parameters which tell it the new task to be executed.

Figure 3:
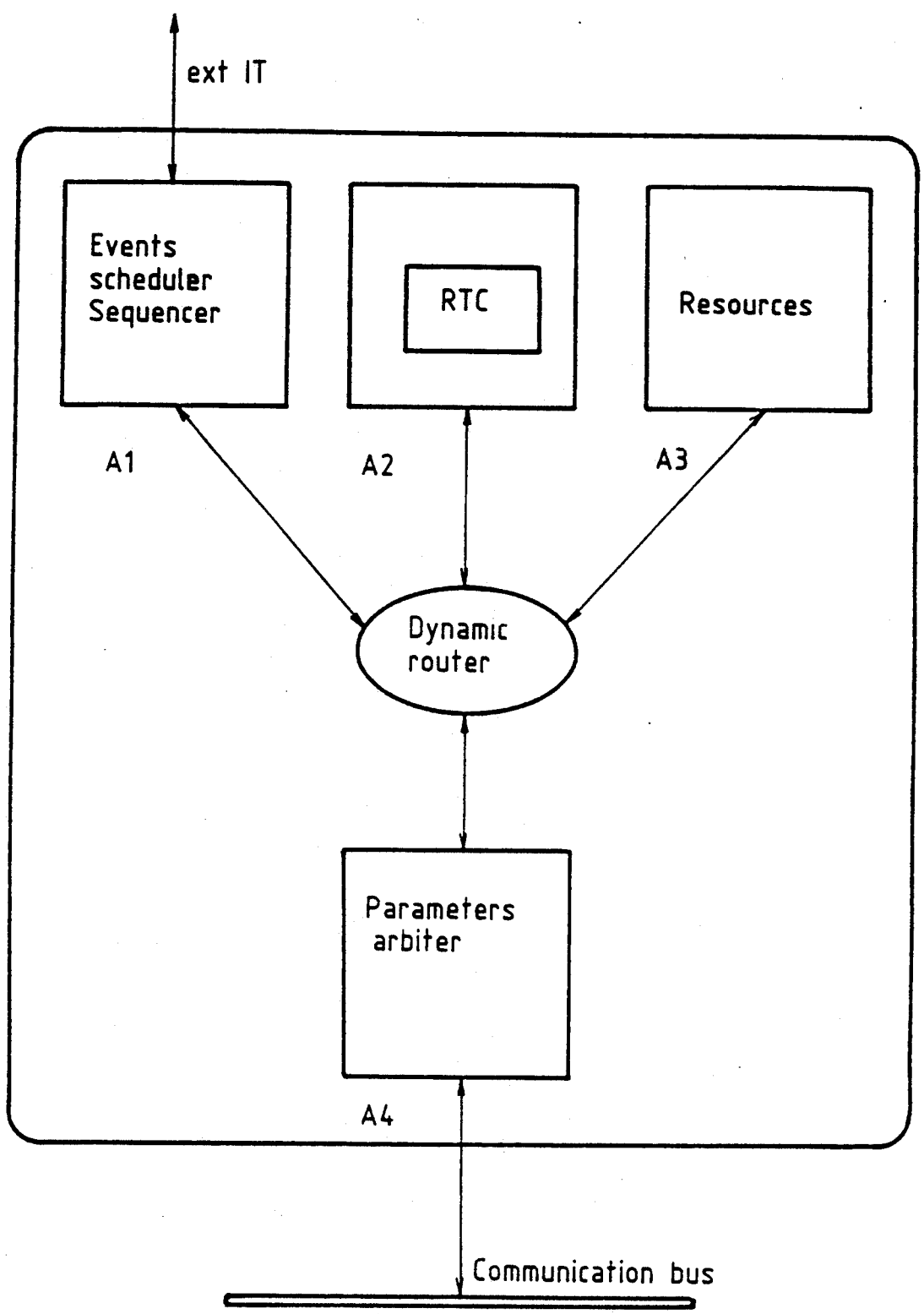
FIG. 3 is a block diagram of the architecture of an RTO component in accordance with the invention.

As shown in FIG. 3, the RTO circuit comprises at least four automatic devices each dedicated to the management of specific real time objects:

The automatic device A1 can manage eligible tasks awaiting a processor and all tasks awaiting an event. It processes external interrupts. It can also supervise all processing done by the other automatic devices when a primitive is executed.

The clock automatic device A2 can manage timers, cycles, protection timers (completion times and execution times) and the real time clock.

The automatic device A3 can manage resource queues.

The automatic device A4 can manage communications with processors and arbitrate between RTO circuit internal processing requests and primitive requests submitted by a processor.

Each of these automatic devices comprises the hardware resources needed for the processing which it performs.

Figure 4:
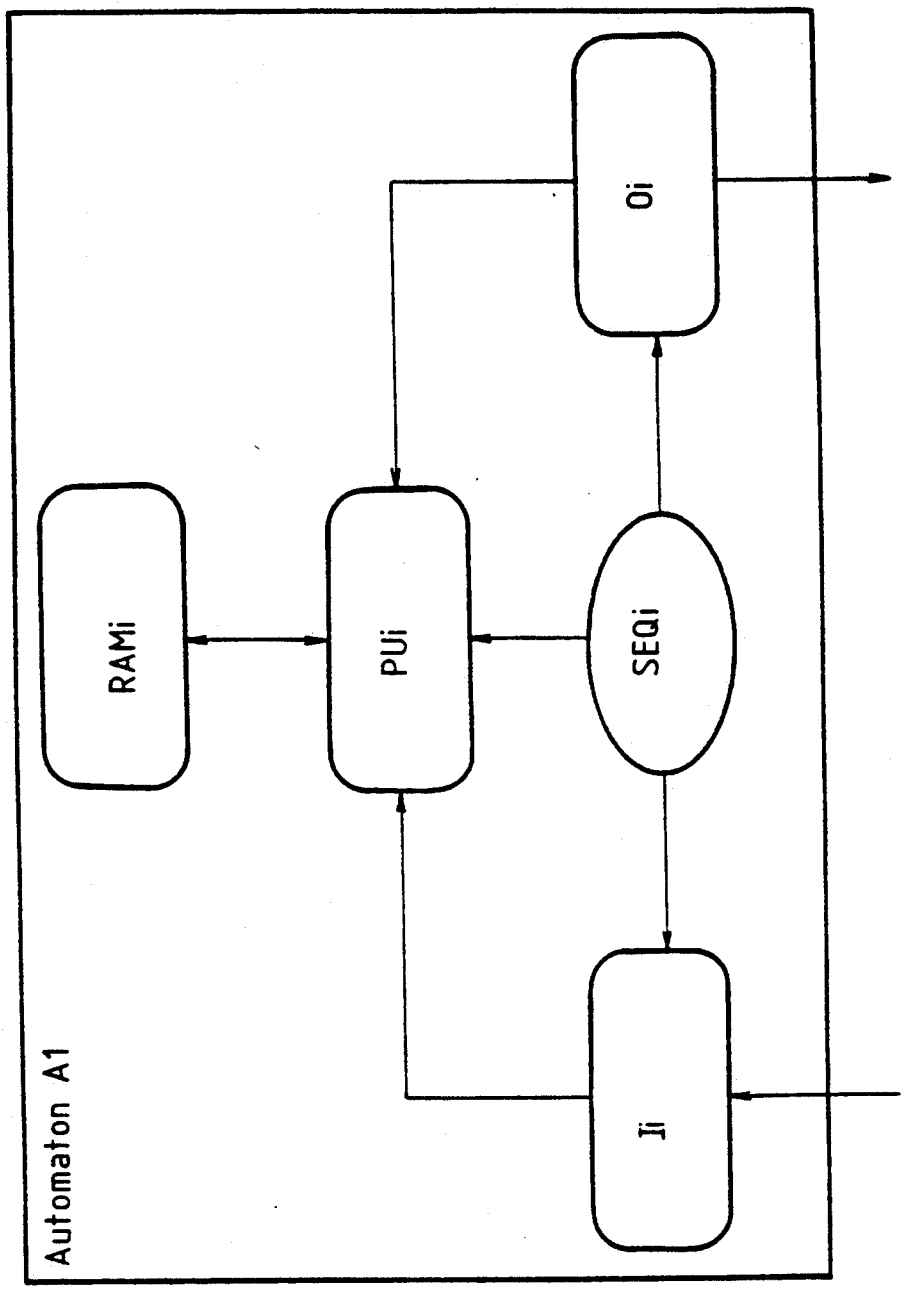
FIG. 4 shows one embodiment of a hardware structure for one of the automatic devices of the RTO circuit shown in FIG. 3.

In the FIG. 4 example, the hardwired sequencer SEQi drives an input register Ii, an output register Oi and the processor unit PUi associated with the random access memory RAMi.

The inputs and the outputs of these automatic devices are interconnected by a dynamic router.

The RTO further comprises at least one communication device, possibly an asynchronous communication device, connecting the RTO circuit and the interface CBI. Also, the RTO circuit comprises means for sending an interrupt signal to the processor concerned, in particular if the choice algorithm decides upon a change of task on this processor, following internal processing (timer or hardware event) or a primitive requested by a processor other than that for which the RTO circuit is responsible, or after a temporal exception (completion or execution time exceeded, cycle on a task not completed), this interrupt signal remaining active until the processor has accessed the operator to read the code of the operation to be performed.

The automatic device A2 may comprise a real time clock (RTC) and counting logic. The RTC has a period which is programmable by invoking a request specific to the RTO circuit and counting logic.

The RTC is designed to send a clock interrupt signal CIT for the sequencer of the automatic device A2 in order to initiate the updating of the counters associated with the task when a period has elapsed. This interrupt signal takes priority and is therefore processed as soon as the automatic device A2 has completed the current operation. The automatic device A2 sends an interrupt signal to the automatic device A1 only if there are tasks to be rendered eligible.

The automatic device A1 may comprise external interrupt control inputs ext IT and means for shaping and storing these interrupt signals.

Figure 5:
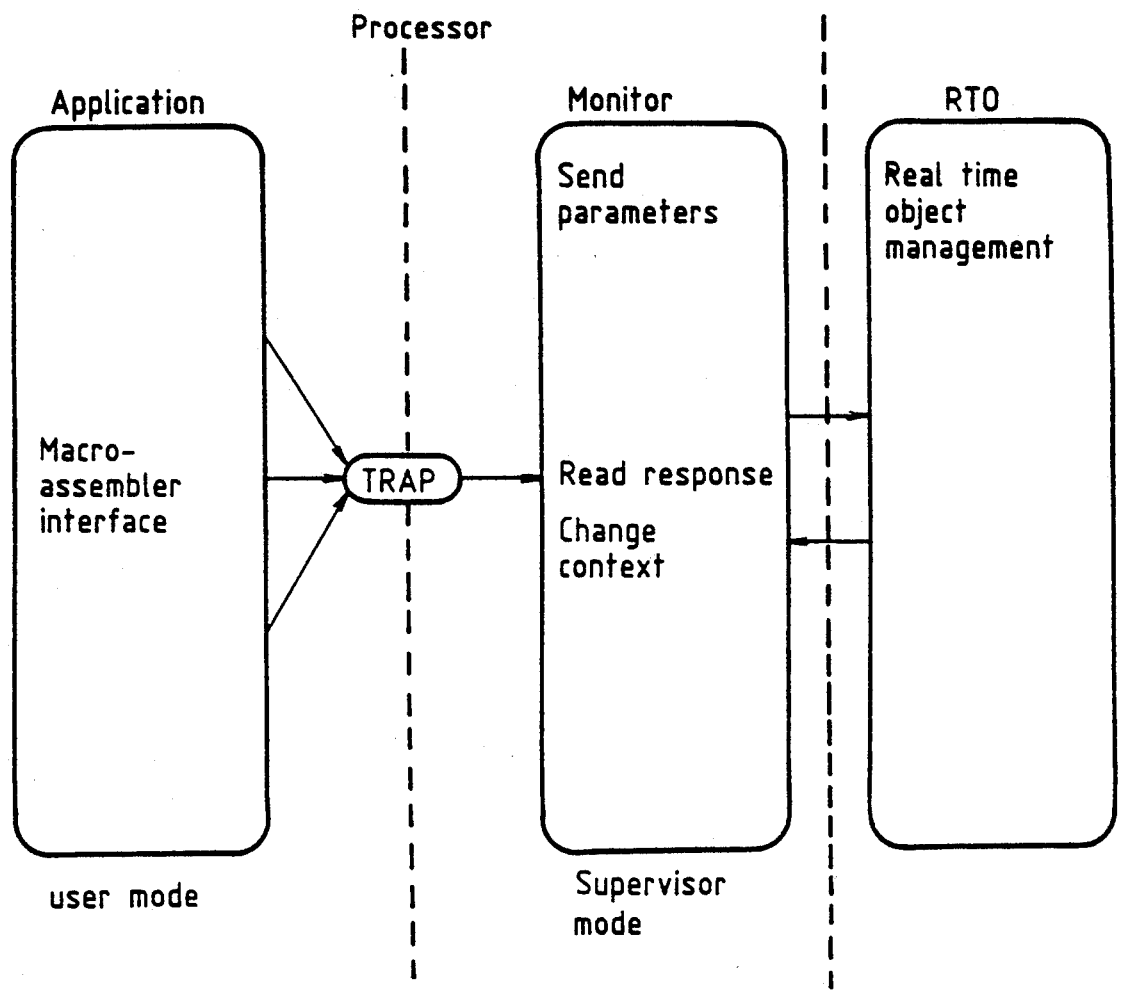
FIG. 5 is a block diagram of the application/monitor/RTO interface.

In the context of an application, the interface between the processor (user mode) and the RTO is a monitor (supervisor mode) using a process shown in FIG. 5.

A microprocessor accesses the monitor by way of a TRAP instruction. This instruction, enabling system calls by an application, forces an exception and switches from the user mode to the system mode in which all the code belonging to the monitor is executed. All of the monitor is written in assembler language.

A request to the monitor comprises a group of assembler language instructions carrying out the following functions:

save registers needed for parameters, load parameters into freed registers or into random access memory, enter TRAP monitor, (execute request), after return, restore registers used.

Because the monitor is the interface between the processor and the operator RTO, the code executed is as follows:
request primitive (test if RTO is free),
send parameter(s),
read response indicating operation to perform,
where applicable, change task,
return to user program.

Note that the only time the processor cannot be interrupted is during the context change phase.

In the timing diagrams of FIG. 6a through 6d the tasks executed by the processors P1 and P2 are shown as a succession of rectangular boxes separated by interfaces and the freed/processing state of the circuits RTO1, RTO2 for this process is indicated by crenelated curves in corresponding relationship to the boxes.

Figure 6A:
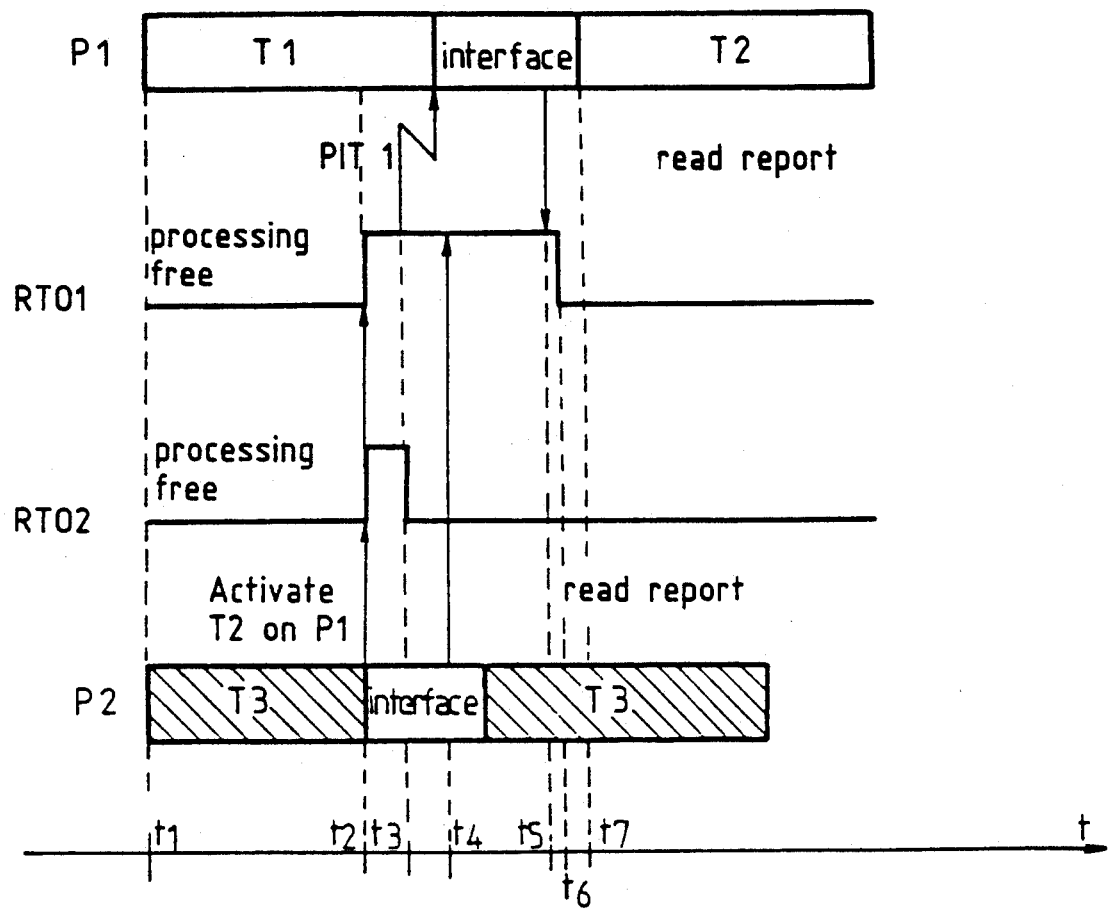
FIGS. 6a through 6d are timing diagrams showing various primitive execution modes, namely:
execution of a remote primitive with task change (FIG. 6a),
execution of a remote primitive on a processor P1 with task change and local processing on a processor P2 with task change (FIG. 6b),
execution of two local processes, one with task change (FIG. 6c),
execution of a global primitive with task change on two processors (FIG. 6d).

In the FIG. 6a example, at the time t1 the processor P1 is executing a task T1 and the processor P2 is executing a task T3. At time t2 the task T3 sends a primitive to the RTO in order to activate a task T2 on the processor P1.

The two components RTO1, RTO2 begin to process this primitive at time t2.

The component RTO2 analyzes the parameters sent by the processor P2 and realises that it is not this processor which is managing the task T2 to be activated: it therefore reverts quickly to the "free" state at time t3.

The component RTO1 sets the task T2 to the "eligible" state and senses that the task T2 has a higher priority than the task T1 currently being executed on the processor P1: it therefore sends an interrupt PIT1 to the processor P1 to report a current task change. The processor P1 processes the interrupt PIT1 at time t4 and then at time t5 reads the report telling it to suspend the task T1 and to elect the task T2. After this read operation, the component RTO1 reverts to the free state at time t6. During this time the interface of processor P1 carries out the context change and then the processor P1 begins to execute the task T2 at time t7. During this time, and independently of the processor P1, the processor P2 reads the report of its activation primitive at time t4. Because the circuit RTO1 processed the primitive, it is this circuit which will respond with a report indicating that the primitive has been executed correctly. After an interface of processor P2, the processor P2 will therefore resume the processing of the task T3.

Figure 6B:
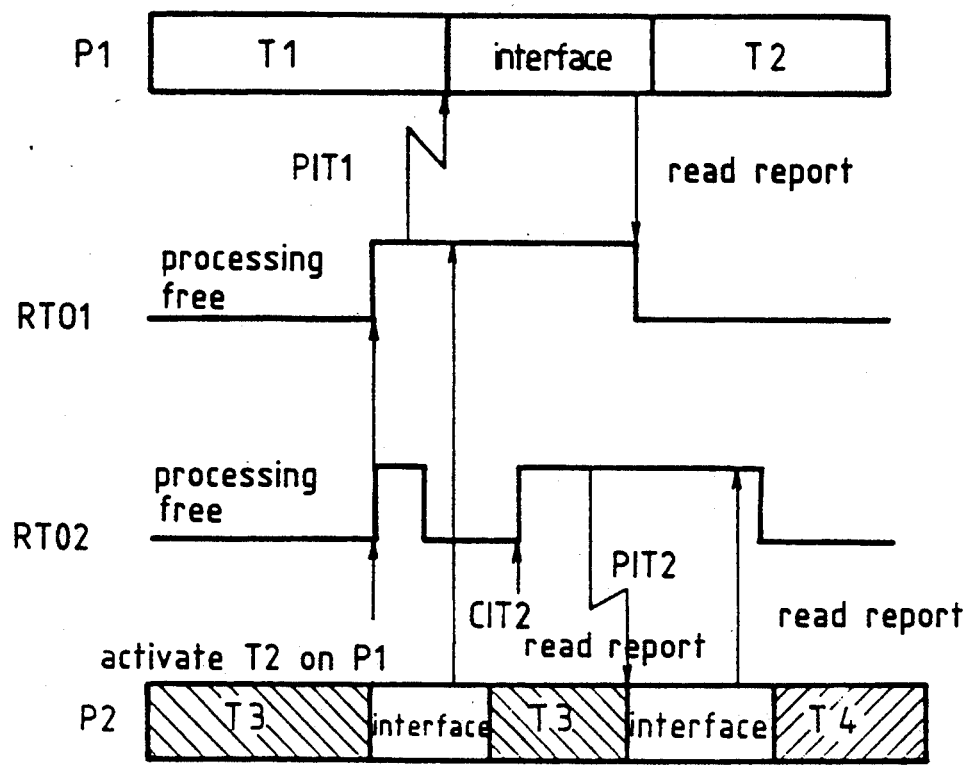

FIG. 6b shows in a similar way the execution by the processor P2 of a remote primitive on the processor P1 bringing about a change of task on the processor P1 and the expiry of a timer on the circuit RTO2 causing a change of task on the processor P2.

Initially the processor P1 is executing the task T1 and the processor P2 is executing the task T3 which at a given time requests the operator RTO to activate the task T2 on the processor P1.

The two components RTO1 and RTO2 begin to processes the primitive.

The component RTO2 analyzes the parameters sent by the processor P2 and realises that it is not this processor which is managing the task T2 to be activated: it therefore reverts quickly to the "free" state.

The component RTO1 sets the task T2 to the "eligible" state and senses that the task T2 has a higher priority than the current task T1 on the processor P1: it therefore sends an interrupt PIT1 to the processor P1 to report a current task change. The processor P1 processes the interrupt PIT1 and reads the report telling it to suspend the task T1 and to elect the task T2. The interface carries out the context change and the processor P1 begins to execute the task T2. During this time, and independently of the processor P1, the processor P2 reads the report of its activation primitive; because the component RTO1 processed the primitive, it is this component which will respond with a report indicating that the primitive has been executed correctly. The processor P2 then resumes processing the task T3.

While the component RTO1 is still processing the activation primitive of the task T2 the component RTO2 detects the expiry of a timer which activates the task T4.

The "clock" automatic device sends the signal CIT2 to the sequencer of the component RTO2 which starts processing immediately because it its "free". The component RTO2 sets the task T4 to the "eligible" state and senses that the task T4 has a higher priority than the current task T3 on the processor P2: it therefore sends an interrupt PIT2 to the processor P2 to report a current task change. The processor P2 processes the interrupt PIT2 and reads the report telling it to suspend the task T3 and to elect the task T4. The interface carries out the context change and the processor P2 begins to execute the task T4.

In this example a primitive on the component RTO1 and a local process on the component RTO2 are processed in parallel.

Figure 6C:
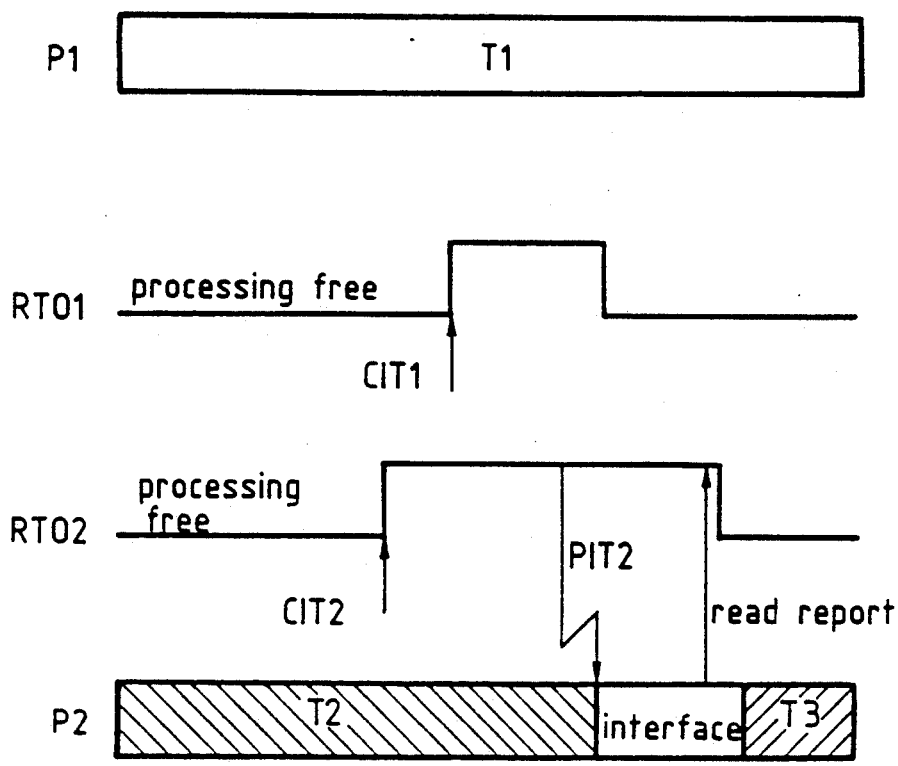

FIG. 6c shows simultaneous local processing on the components RTO1 and RTO2 bringing about a task change on the processor P2.

Initially the processor P1 is executing the task T1 and the processor P2 is executing the task T2.

At virtually the same time the component RTO2 detects the expiry of a timer which activates the task T3 and the component RTO1 detects the expiry of a timer which activates the task T4. The "clock" automatic devices of the components RTO1 and RTO2 respectively send the signal CIT2 to the sequencer of the component RTO2 and the signal CIT1 to the sequencer of the component RTO1. The components RTO1 and RTO2 immediately start processing because they are "free", without needing to consult the state of the other component because this is local processing. The component RTO1 sets the task T4 to the "eligible" state and senses that the task T4 has a lower priority than the current task T1 on the processor P1: it therefore reverts to the "free" state without interrupting the processor P1 because there is no task change. The processing by the component RTO1 is totally transparent to the processor P1. The component RTO2 sets the task T3 to the "eligible" state and senses that the task T3 has a higher priority than the current task P2 on the processor P2: it therefore sends an interrupt PIT2 to the processor P2 to report a current task change. The processor P2 processes the interrupt PIT2 and reads the report telling it to suspend the task T2 and to elect the task T3. The interface carries out the context change and the processor P2 begins to execute the task T3.

Note that in this example the components RTO1 and RTO2 have processed their local request entirely independently and that the processor P1 has not been interrupted because the local processing on the component RTO1 has not brought about a change of task on the processor P1.

Figure 6D:
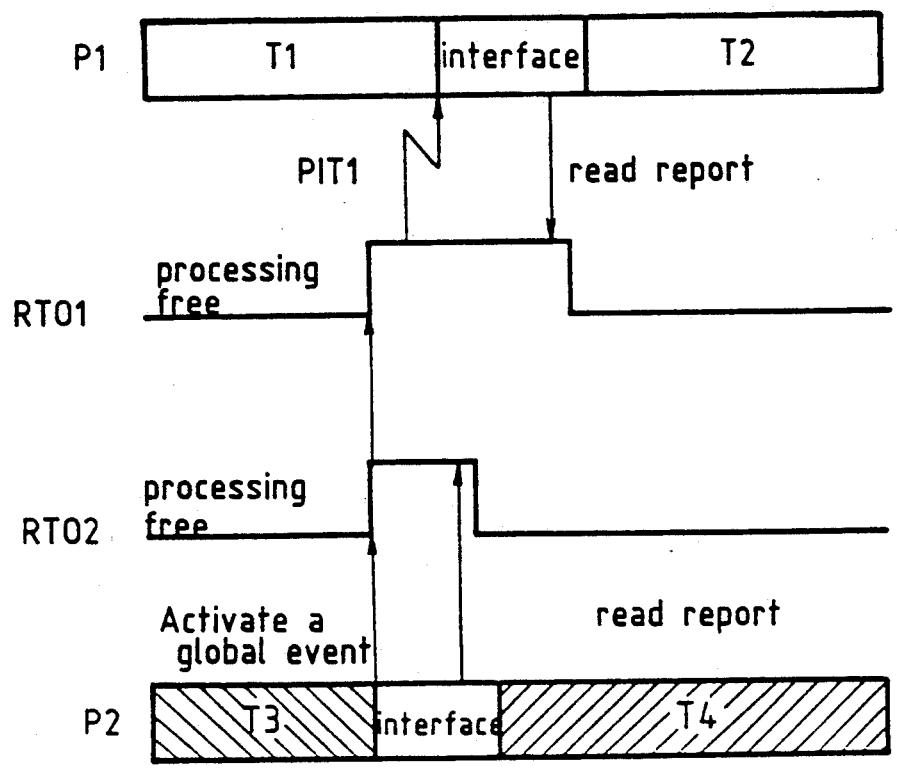

FIG. 6d shows a global primitive causing a change of task on the processors P1 and P2.

The processor P1 is executing the task T1.

The processor P2 is executing the task T3 which at a given time asks the RTO to activate a global event.

The components RTO1 and RTO2 begin to process the primitive.

The component RTO1 sets the task T2 (which was awaiting the event) to the "eligible" state and senses that the task T2 has a higher priority than the current task T1 on the processor P1: it therefore sends an interrupt PIT1 to the processor P1 to report a current task change because the processor P1 which is executing the task T1 is not connected to the RTO at this time.

The processor P1 processes the interrupt PIT1 and reads the report produced by the component RTO1 telling it to suspend the task T1 and to elect the task T2. The component RTO1 then reverts to the "free" state, the interface carries out the context change and the processor P1 begins to execute the task T2.

During this time the component RTO2 sets the task T4 (which was waiting for the event) to the "eligible" state and senses that the task T4 has a higher priority than the current task T3 on the processor P2: it therefore produces a report indicating a current task change. It does not need to send the interrupt PIT2 because it is its associated processor P2 which has requested the primitive: the processor P2 therefore reads a report. When the processor P2 reads the report of its event activation primitive, the component RTO2 sends it a report indicating that the primitive has been executed correctly and telling it to suspend the task T3 in favor of the task T4. The component RTO2 then reverts to the "free" state, the interface carries out the context change and the processor P2 begins to execute the task T4.

Note that in this example the components RTO1 and RTO2 process the same primitive in parallel, each activating the tasks of its associated processor awaiting the event. Also, only the component RTO1 needs to send an interrupt PIT1 to its associated processor.

There is claimed:

1. Device for optimizing the performance of a real time executive kernel in a multiprocessor structure comprising one or more processors, said device comprising a real time operator behaving, as seen from a processor of said structure, as a memory area and comprising means for sending and for receiving data to be processed, means for generating communication control signals, means for associating with objects managed by a kernel, especially tasks, each having a state, hardware and software events, resources and time, a series of primitives one primitive at a time to manage a clock resource and active resources, means for managing a real time context of said processors of said structure on the basis of a predetermined strategy by means of a scheduler, said scheduler being adapted in particular to activate the tasks cyclically, means for marking waits on timers, means for activating tasks after timers, and means for deciding to change the state of a task to another state on the basis of the primitives of the real time context, wherein said real time operator is organized in a plurality of identical hardwired real time operator circuits, accessible simultaneously by said processors of said structure but each associated with one only of said processors, said circuits being interconnected by a link adapted to transmit an "AGREED" signal ensuring that said real time operator executes only one primitive at a time, each real time operator circuit comprising a scheduler which manages the tasks of only the processor associated with it and global resources and events of the real time operator, said scheduler comprising means for activating the tasks cyclically, means for marking waits on timers and means activivating tasks after timers, said real time operator deciding to change the task state on the basis of primitives of the real time context, said device comprising means for commuting each real time operator circuit in one of the following three functioning modes:
   a) a first mode in which it processes a primitive requested by one of said processors of said structure,
   b) a second mode in which it processes a local request internal to the circuit concerning only tasks for which it is responsible,
   c) a third mode in which it is awaiting processing.

2. Device according to claim 1 wherein said real time operator comprises means for processing one of said primitives only if all said real time operator circuits are awaiting processing.

3. Device according to claim 1, wherein said real time operator comprises means for communicating with said multiprocessor structure according to the following process:
   request for access to said real time operator by said structure to process a primitive, with verification beforehand by said structure of free access to said real time operator and subsequent hardware response to said verification from said real time operator to said structure,
   if said real time operator is free, sending by said structure of a code and of parameters of the primitive to the real time operator merely by writing an addressing area of the real time operator,
   execution by said real time operator after acquisition of said codes and of said parameters of an operating sequence relating to said primitive,
   decision by said real time operator, as a function of said primitive and of said real time context:
   to produce a response to the processor which requested said primitive,
   to interrupt the processors on which said primitive has caused a change of task, and
   reading of a real time operator response by the processor which requested said primitive and by the processors which have received an interrupt, at a real time operator address.

4. Device according to claim 3 which comprises a "test and set" type mechanism included in said real time operator which carries out said verification and which is adapted to send to the structure processor which requests access in read mode a response representative of the "free" or "busy" state of said real time operator.

5. Device according to claim 1 wherein said real time operator circuits each allocate according to their own strategy their associated processor to one of their eligible tasks, preferably a task capable of being executed on said processor which has the highest priority.

6. Device for optimizing the performance of a real time executive kernel in a multiprocessor structure comprising one or more processors, said device comprising a real time operator behaving, as seen from a processor of said structure, as a memory area and comprising means for sending and for receiving data to be processed, means for generating communication control signals, means for associating with objects managed by a kernel, especially tasks, each having a state, hardware and software events, resources and time, a series of primitives one primitive at a time to manage a clock resource and active resources, means for managing a real time context of said processors of said structure on the basis of a predetermined strategy by means of a scheduler, said scheduler being adapted in particular to activate the tasks cyclically, means for marking waits on timers, means for activating tasks after timers, and means for deciding to change the state of a task to another state on the basis of the primitives of the real time context, wherein said real time operator is organized in a plurality of identical hardwired real time operator circuits accessible simultaneously by said processors of said structure but each associated with one only of said processors, said circuits being interconnected by a link adapted to transmit an "AGREED" signal ensuring that said real time operator executes only one primitive at a time, each real time operator circuit comprising a scheduler which manages the tasks of only the processor associated with it and global resources and events of the real time operator, said scheduler comprising means for activating the tasks cyclically, means for marking waits on timers and means activating tasks after timers, said real time operator deciding to change the task state on the basis of primitives of the real time context each real time operator circuit comprising at least four automatic devices dedicated to the management of specific real time objects, in particular management of eligible tasks awaiting availability of their processor, management of communications with processors, management of timers, cycles and the real time clock, resource queues, all tasks awaiting an event and processing of external interrupts, said automatic devices communicating with each other via buses internal to said real time operator circuit interconnected by a dynamic router under the control of a sequencer included in one of said automatic devices.

7. Device according to claim 6 wherein said real time operator circuits are combined on a common circuit board connected to the common bus interconnecting all said processors of said structure with a common interface to said bus.

8. Device according to claim 6 wherein each real time operator circuit is on the circuit board of the processor whose tasks it manages with an interface to the common bus of said multiprocessor structure.

9. Device according to claim 6 wherein each real time operator circuit is colocated with the processor whose tasks it manages with an interface to the local bus so that when a processor of said multiprocessor structure executes a primitive it sends its parameters to the associated real time operator circuit via said local bus and simultaneously to the other real time operator circuits via said common bus and comprises common bus arbiter logic which assures taking possession of said local bus of all said real time operator circuits during a single access.

10. Device according to claim 6 wherein each of said automatic devices comprises a processor unit and at least one input register and one output register and said automatic device outputs and inputs are interconnected by a dynamic router, one or more memory elements in the form of random access memory, for example, and a hardwired sequencer.

11. Device according to claim 10 wherein said real time operator circuit further comprises at least one communication device, possibly an asynchronous communication device, connecting said real time operator circuit and said common bus dedicated interface and means for sending an interrupt signal to the processor concerned only when said operator defines a change of task on said processor after internal processing (timer or hardware event) or after a primitive requested by a processor other than that for which said real time operator circuit is responsible or after a temporal exception (completion time or execution time exceeded, cycle on a task not finished), said interrupt signal remaining active until said processor has accessed said operator to read the code of the operation to be performed.

12. Device according to claim 6 wherein at least one of said automatic devices comprises a real time clock having a period programmable by invoking a specific request to said operator and counting logic.

13. Device according to claim 12 wherein said real time clock is adapted to send an internal interrupt signal to said real time operator circuit initating immediate processing if said real time operator circuit is waiting or after the primitive currently being executed.

14. Device according to claim 6 wherein at least one of said automatic devices comprises external interrupt control inputs and means for shaping and memorizing said interrupt signals which are then routed to a priority encoder and said operator processes the highest priority interrupt stored at this time and resets said memory means.

15. Device according to claim 14 wherein said automatic device managing events further comprises a partially erasable random access memory used when an event occurs to accelerate the clearing of waits on events for all the tasks activated by the event processed.

* * * * *